United States Patent
Thiele

(10) Patent No.: US 6,626,533 B2
(45) Date of Patent: Sep. 30, 2003

(54) SPECTACLE FRAME AND A HINGE ASSEMBLY FOR USE THEREIN

(75) Inventor: Jens Frederik Anton Thiele, Charlottenlund (DK)

(73) Assignee: F.A. Thiele A/S, Hvidovre (DK)

( * ) Notice: Subject to any disclaimer, the term of this patent is extended or adjusted under 35 U.S.C. 154(b) by 0 days.

(21) Appl. No.: 10/020,959

(22) Filed: Dec. 19, 2001

(65) Prior Publication Data

US 2002/0118336 A1 Aug. 29, 2002

(30) Foreign Application Priority Data

Dec. 21, 2000 (EP) .............................. 00610136

(51) Int. Cl.$^7$ ................................. G02C 5/22
(52) U.S. Cl. ...................... 351/153; 351/119; 16/228
(58) Field of Search .................. 351/111, 119, 351/121, 153, 140, 149, 90, 92, 99, 100, 101; 16/228

(56) References Cited

U.S. PATENT DOCUMENTS

| | | | | |
|---|---|---|---|---|
| 5,751,394 A | * | 5/1998 | Masunaga | 351/113 |
| 5,793,464 A | * | 8/1998 | Chen | 351/116 |
| 6,070,978 A | | 6/2000 | Temming | |

FOREIGN PATENT DOCUMENTS

| | | | |
|---|---|---|---|
| EP | 0 661 576 A1 | 7/1995 | |
| EP | 0 877 278 A1 | 11/1998 | |
| EP | 0 902 313 A1 | 3/1999 | |
| EP | 0 978 749 A1 | 2/2000 | |
| JP | 406043398 | * 2/1994 | ................. 351/121 |
| WO | WO 94/29763 | 12/1994 | |

* cited by examiner

Primary Examiner—Huy Mai
(74) Attorney, Agent, or Firm—Sughrue Mion, PLLC

(57) ABSTRACT

A spectacle frame comprises at least one lens engaging frame member (3, 4) and a pair of temple members (10) made from metallic wire material. An end piece (10a) of a temple member is pivotally connected with an end piece (3a, 4a) of the frame member (3, 4) by a hinge assembly (12) comprising relatively short, elongate first and second hinge members (14, 15) made of substantially the same metallic material as the wire material of the frame and temple members (3, 4, 10). In the hinge members (14, 15) bores (16 to 18) are formed for accomodation of the end piece (3a, 4a) of the frame member (3, 4) and the end piece (10a) of a temple member (10), respectively, with a firm frictional fit and the first and second hinge members (14, 15) are pivotally interconnected to confine relative rotational movability of the hinge members substantially to a planar movability about a single axis of rotation.

30 Claims, 3 Drawing Sheets

SPECTACLE FRAME AND A HINGE ASSEMBLY FOR USE THEREIN

BACKGROUND OF THE INVENTION

1. Field of the Invention

The present invention relates to a spectacle frame comprising at least one lens engaging frame member having end pieces projecting outside a peripheral edge of each of a pair of lenses and a pair of temple members each having an end piece pivotally connected with one of the end pieces of said frame member by a hinge assembly, said frame and temple members being made of metallic wire material.

The invention further relates to a hinge assembly for use in such a spectacle frame.

2. Background

Spectacle frames of this kind having frame and temple members made of small diameter light weight metallic wire material such as titanum are known e.g. from EP-B1-0 256 098, EP-B1-0 546 589, U.S. Pat. No. 5,518,566, WO 92/08158 and WO 97/23803 and have gained increasing popularity due to their high strength and very low weight and the comfort in use resulting therefrom.

From a design point such spectacle frames are attractive by offering the possibility of a very discrete framing of eye glass lenses covering a minimum of the users' face, but when made of titanium wire also the possibility of an appealing design due to the ability of titanium wire material to be coloured by an electrical process to meet users individual tastes.

Together with the possibility of making such spectacle frames in a rimless design, where small wire pieces connected with the temple members are fixed in slits or holes formed directly in the lenses, as well as in full-rimmed and half-rimmed versions these design options provide for a relatively wide range of frame designs to meet individual needs and tastes of users.

From a mechanical strength aspect the hinge assemblies serving to provide pivotal connections between each of the temple members and the lens engaging frame member or members are vital parts of the structure of such spectacle frames. On one hand, the hinge assemblies underlie the same geometrical constraints as made to conventional spectacle frames in the sense that they must allow pivotal movement of the temple members from a folded position, in which they extend overlapping each other close to and substantially parallel with the lenses, to the position of use, in which they extend substantially at right angles to the lenses at either side of the frame structure. On the other hand, a hinge assembly for use in a spectacle frame must provide a stop for the pivotal movement of the temple member connected therewith to provide a geometrically well-defined and stable position of use.

To meet these requirements as well as the desirability for the hinge assemblies to match the wire design for the frame and temple members use is made in the prior art frame structures disclosed in the above-mentioned patent publications of hinge assemblies made entirely of the same wire material as the frame and temple members. Typically, such a hinge assembly comprises as one hinge part a central straight pintle wire portion formed e.g. by a frame member and as the other hinge part a coil wound wire portion formed e.g. by a temple member and surrounding the pintle portion. The two parts are materially separated such that they are freely rotatable with respect to each other within normal limits without the coil portion acting as a torsion spring. The coil portion is axially held between wire portions bent out from opposed ends of the pintle wire portion and a ro-tation stop for the side bars is provided by a free wire end at one end of the coil portion.

Besides adding a somewhat "technical" outlook that may be felt by users to detract from the otherwise attractive appearance of spectacle frames of wire material, such hinge assemblies are often flimsy and resilient and, in result, often felt wobbly and unstable in use. Moreover, there is no possibility to compensate for such an instability by tightening of the hinge assembly as is the case with conventional spectacle hinges using a screw as fulcrum for the pivotal movement.

From EP-A1-0 978 749 another design of a hinge assembly for use in wire-framed spectacles is known, in which free end parts of a frame member and a temple member are bent into bow or hook shape and fitted into bores in a common relatively bulky hinge block. With this design the pivotal movability of the frame and temple members with respect to each other relies on the possibility of the bent end parts to turn with respect to the hinge block, whereby the hinge assembly will appear wobbly and unstable in use.

SUMMARY OF THE INVENTION

On this background, it is the object of the invention to provide a spectacle frame of the kind defined and a hinge assembly for use in such a spectacle frame that will ensure safe connection of the frame and temple members and steady and reliable movement of the temple members between their folded position and a well-defined and stable position of use, while preserving the attractive appearance of wire-rimmed spectacles of the kind set forth, including by the use of titanium or a titanium alloy for the wire material the possibility of colouring the entire spectacle frame including the hinge assemblies in the full range of colours attainable by electrical treatment of such materials.

According to the invention, a spectacle frame of the kind defined and a hinge assembly for use therein are characterized in that the hinge assembly comprises relatively short elongate first and second hinge members made of substantially the same metallic material as said wire material and each having a bore for accommodation of an end piece of said frame member and the end piece of a temple member, respectively, with a firm frictional fit, said first and second hinge members being pivotally interconnected to con-fine relative rotational movability of the hinge members substantially to a planar movability about a single axis of rotation.

Preferred and advantageous embodiments of the spectacle frame and hinge assembly according to the invention are stated in dependent claims 2 to 8 and 10 to 16, respectively.

The spectacle frame and hinge assembly design of the invention is well suited for use with the full range of frame designs for wired spectacles including rimless as well as half-rimmed and full-rimmed design variants.

According to a particularly preferred embodiment, a full-rimmed frame design is provided that comprises first and second lens engaging frame members engaging upper and lower peripheral edges of each of said lenses and having end pieces projecting outside a peripheral side edge of each of said lenses, the end pieces of said first and second frame members projecting outside the peripheral side edge of each of said lenses being bent to extend in substantially parallel relationship, whereby bore means is provided in said second hinge member for accomodation of both of said substantially parallel end pieces of the first and second frame members.

BRIEF DESCRIPTION OF THE DRAWINGS

In the following the invention will be described in more detail by way of a preferred although non-limiting embodiment as shown in the accompanying drawings, in which.

DETAILED DESCRIPTION OF THE INVENTION

Figure 1:
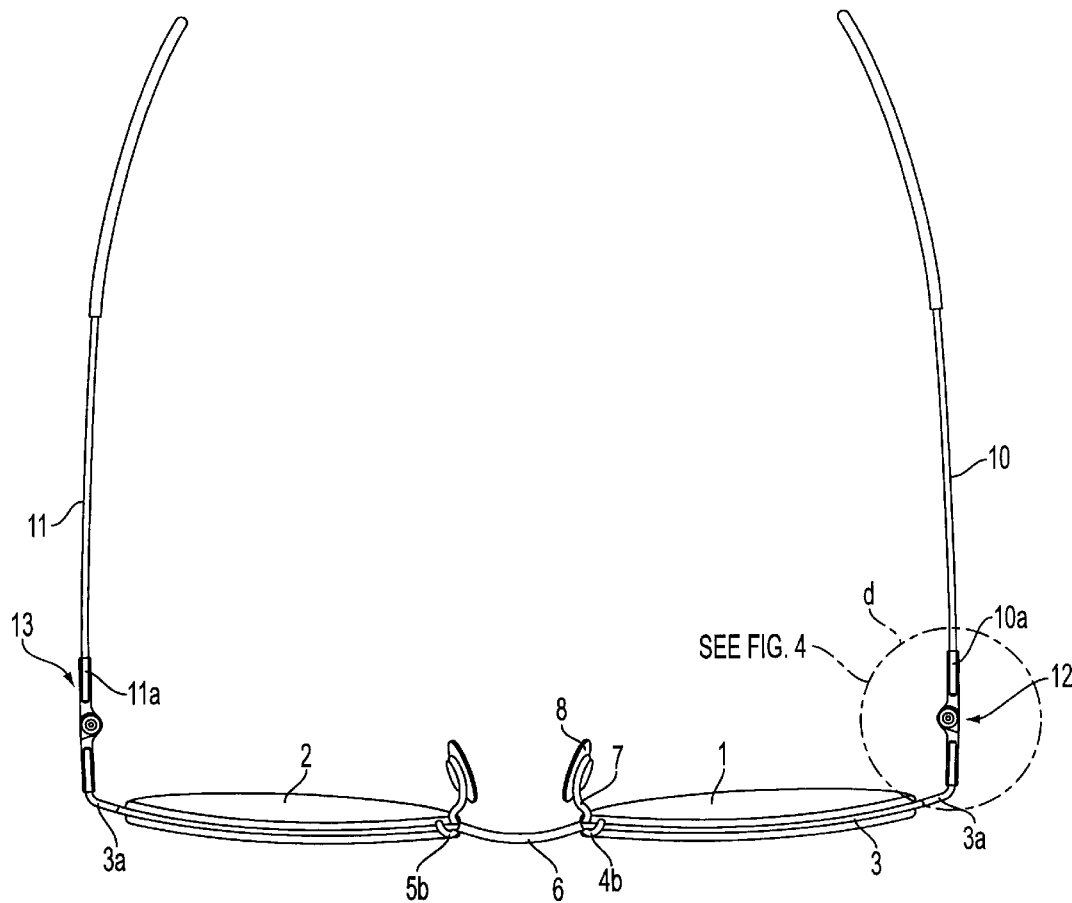
FIGS. 1, 2 and 3 are a top plan view, a front plan view and a side plan view, respectively, of a pair of spectacles embodying the frame and hinge assembly design of the invention.
Figure 2:
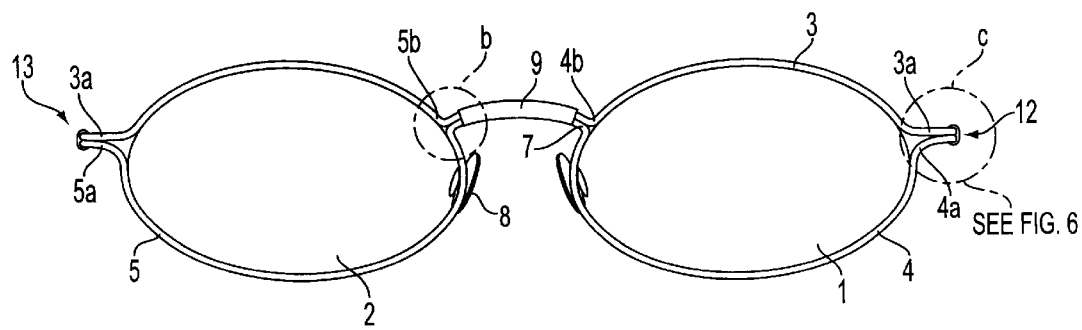
Figure 3:
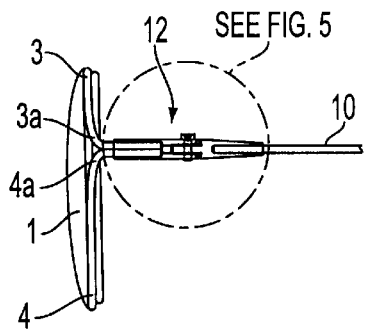

In the full-rimmed spectacle design illustrated by way of embodiment in FIGS. 1 to 3 eye glass lenses 1 and 2 are engaged along their upper and lower peripheral edges by a first lens engaging frame member 3 and a second lens engaging frame member 4 or 5, respectively, which are made from stiff, high strength and light-weight wire material, preferably titanium or a titanium alloy.

Between lenses 1 and 2 the upper frame member 3 is bent into a curved shape to provide a nose bridge 6. Each of the second frame members 4 and 5, which are formed by separate wire pieces for each of lenses 1 and 2 engages not only the lower peripheral edge of the re-spective lens 1 or 2, but also the inner side peripheral edge thereof up to the nose bridge 6, at which a free end 4b, 5b of the second member 4,5 is bent into hook-shape around the first frame member 3 to provide locking of frame members 4 and 5 with frame member 3 for a stable full-rimmed framing of lenses 1 and 2. This mutual locking of the frame members 3 to 5 is made relatively easily detachable, however by use of an appropriate tool to allow for dismounting of the framing of lenses 1 and 2, e.g. when replacement of one or both of lenses 1 and 2 is necessary or desirable. At the nose bridge 6 a short piece 7 of wire material extends along the nose bridge part of the first frame member 3 to provide a nose pad holder for resilient nose pads 8 at either side of the nose bridge 6. Moreover, at the nose bridge 6 the corresponding co-extending parts of the first frame member 3 and the wire piece 7 providing the nose pad holder are tightly surrounded by a curved substantial-ly tubular enclosure 9.

Outside the outer peripheral side edge of each of lenses 1 and 2 free end pieces 3a and 4a, 5a, respectively, of frame members 3 to 5 are bent substantially into L-shape under an angle, such that the extreme section of an end part will project substantially at right angles to the geometrical plane of lenses 1 and 2. The end pieces 3a and 4a, 5a are pivotally connected with end pieces 10a and 11a of temple members 10 and 11, respectively, which are formed from the same wire material as the frame members 3 to 5 by means of hinge assemblies generally designated by 12 and 13, respectively.

Figure 4:
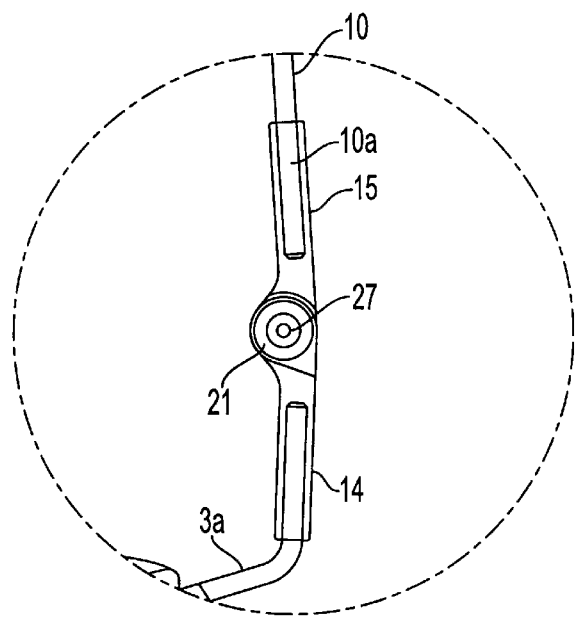
FIGS. 4 and 5 are enlarged sections of FIGS. 1 and 3, respectively, illustrating a preferred design of the hinge assembly.
Figure 5:
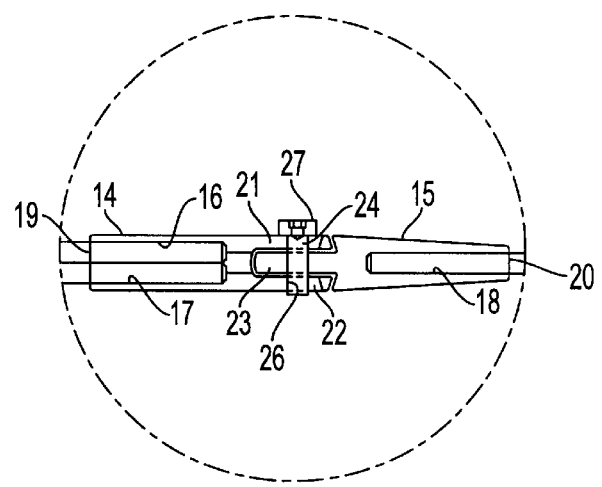

As more clearly seen in the enlarged sections in FIGS. 4 and 5 each of hinge assemblies 12 and 13 comprises two hinge members 14 and 15, which are firmly connected with an end piece 3a of the first frame member 3 as well as an end piece 4a or 5a of a second frame member 4 or 5 and with an end piece 10a or 11a of a temple member 10 or 11.

In accordance with the invention, the firm connection between a hinge member 14 or 15 and the end piece 3a to 5a or 11a of the associated frame or temple members is provided by making the hinge members of substantially the same material as the wire material used for the frame and temple members and forming in each hinge member a bore for accomodation of each of the associated frame or temple member end pieces to be connected therewith with a firm frictional press fit.

Figure 6:
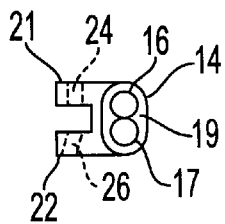
FIGS. 6 and 7 are end plan views of first and second hinge members of the hinge assembly, and FIGS. 8(a,b) illustrate the hinge assembly in two different relative positions of the hinge members during movement between the folded position and the position of use of the temple and frame members.
Figure 7:
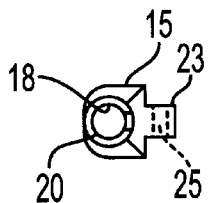

As illustrated in FIGS. 6 and 7, each of hinge members 14 and 15 is preferably formed as a relatively short elongate member having a rounded generally rectangular cross-sectional shape. The cross-sectional dimensions of the hinge members are kept at a minimum to provide optimum matching of the hinge members to the diameter of the wire material used for the frame and temple members.

Preferably, the hinge members are formed as solid cast members of titanium as used for the wire material of the frame and temple members or of a titanium alloy of substantially the same composition as a titanium alloy used for the frame and temple members.

In the illustrated embodiment the hinge member 14 connected with end pieces 3a and 4a of frame members 3 and 4 are formed with two distinct bores 16 and 17, respectively, with parallel axes for separate accomodation of each of said end pieces. As illustrated, the bores 16 and 17 may, however, be open towards each other to provide a substantially 8-shaped bore cavity. Alternatively, a single bore of oblong cross-sectional shape may be formed in hinge member 14 for joint accomodation of both of end pieces 3a and 4a. In the other hinge member 15 a single bore 18 is formed for accomodation of the end piece such as 10a of temple member 10.

The bores 16, 17 and 18 are formed as blind bores opening in end face 19 and 20 of the respective hinge members 14 and 15. As shown in FIGS. 5 and 7 the provision of the single bore 18 permits tapering of the hinge member 15 towards the end face 20 into a substantially wedge-shaped form to provide optimum matching to the wire dimension of the temple member, with which it is connected.

For pivotal interconnection of the hinge members 14 and 15 the hinge members are formed in the end opposite the end faces, in which the bore or bores 16 to 18 are opening, with flat substantially part-circular end parts 21 to 23 of substantially identical shape, in which holes 24 to 26 are formed to come into mutual alignment in the assembled condition of the hinge members 14 and 15.

To provide a stable pivotal connection, by which the relative rotational movability of hinge members 14 and 15 will be confined substantially to a planar rotational movability about a single well-defined pivot axis, hinge member 14 is formed in the illustrated embodiment with two end parts 21 and 22 forming branches of a bifurcation, and between which the end part 23 of hinge member 15 can be accomodated in a sandwich arrangement.

In the illustrated embodiment the hinge axis is provided by a screw 27 passing through the aligned holes 24 and 25 formed in end part branch 21 of hinge member 14 and end part 23 of hinge member 15 to allow rotational movement of the latter and engaging an internal threading in the bore 26 formed in end part branch 22 of hinge member 14.

Figure 8A:
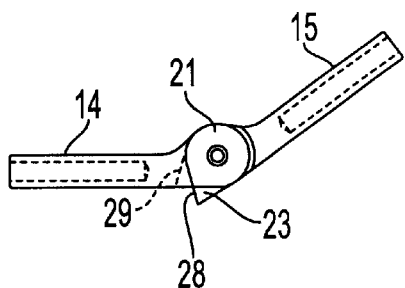
Figure 8B:
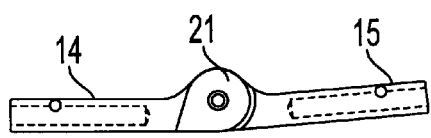

As most clearly seen in FIG. 8 illustrating at a) the relative positions of hinge members 14 and 15 with respect to each other in an intermediate position during the pivotal movement of the temple member 10 from its folded position towards the position of use as shown at b), a rotational stop for the pivotal movement of hinge member 15 with respect to hinge member 14 in the position of use of the frame and temple members may be provided by engagement of an oblique end face 28 of end part 22 of hinge member 15 and a correspondingly oblique bottom wall 29 of the open clearance between the bifurcated end part branches 21 and 22 of hinge member 14.

Whereas the invention has been explained in the foregoing by reference to a single full-rimmed spectacle embodiment only, it will be appreciated that the novel hinge structure of the invention will be applicable to oher wired spectacle frame designs as well, including rimless and half-rimmed structures and that structural details of the frame design with respect to connection of one or more frame members with the spectacle lenses and the shaping of wire material to form a nose bridge and nose pad holders may be different from the actually described embodiment.

In particular, for a rimless design or a half-rimmed frame, where only a single frame member will be connected with each temple member the hinge members may be formed generally identical, e.g. in a tapering wedge-like form as shown for the hinge member 15 in the specifically disclosed embodiment.

What is claimed is:

1. A spectacle frame comprising at least one lens engaging frame member having end pieces projecting outside a peripheral edge of each of a pair of lenses and a pair of temple members each having an end piece pivotally connected with one of the end pieces of said frame member by a hinge assembly, said frame and temple members being made of metallic wire material, characterized in that the hinge assembly comprises relatively short, elongate first and second hinge members made of substantially the same metallic material as said wire material and each having a bore, wherein said bore in said first hinge member accommodates one of (1) said one of the end pieces of said frame member and (2) the end piece of one of said temple members, and said bore in said second hinge member accommodates the other of said one of (1) the end pieces of said frame member and (2) the end piece of one of said temple members with a firm frictional fit, said first and second hinge members being pivotally interconnected to confine relative rotational movability of the hinge members substantially to a planar movability about a single axis of rotation.

2. A spectacle frame as claimed in claim 1, comprising first and second lens engaging frame members engaging upper and lower peripheral edges of each of said lenses and having end pieces projecting outside a peripheral side edge of each of said lenses, the end pieces of said first and second frame members projecting out-side the peripheral side edge of each of said lenses being bent to extend in substantially parallel relationship, characterized in that bore means is provided in said first hinge member for accommodation of both of said substantially parallel end pieces.

3. A spectacle frame as claimed in claim 2, characterized in that said bore means comprises a pair of bores having substantially parallel axes.

4. A spectacle frame as claimed in claim 1, characterized in that each of said hinge members is formed as a solid cast member of said metallic material.

5. A spectacle frame as claimed in claim 1, where said wire material is titanium or a titanium alloy, characterized in that said metallic material is titanium or a titanium alloy of substantially the same composition as said alloy used for said wire material.

6. A spectacle frame as claimed in any of the preceding claims, characterized in that said first and second hinge members are pivotally connected by a pin or screw member extending through aligned holes in said first and second hinge members.

7. A spectacle frame as claimed in claim 6, characterized in that said aligned holes are formed in bifurcated end part branches of one of said hinge members and an end part of the other hinge member for sandwich arrangement between said bifurcated branches.

8. A spectacle frame as claimed in claim 7, characterized in that a rotational stop for the relative pivotal movement of said hinge members is formed by engagement of an oblique end face of the end part of said other hinge member with an oblique bottom wall of the clearance between said bifurcated end part branches of said one hinge member.

9. A spectacle frame as claimed in claim 2, where said wire material is titanium or a titanium alloy, characterized in that said metallic material is titanium or a titanium alloy of substantially the same composition as said alloy used for said wire material.

10. A spectacle frame as claimed in claim 2, characterized in that said first and second hinge members are pivotally connected by a pin or screw member extending through aligned holes in said first and second hinge members.

11. A spectacle frame as claimed in claim 3, where said wire material is titanium or a titanium alloy, characterized in that said metallic material is titanium or a titanium alloy of substantially the same composition as said alloy used for said wire material.

12. A spectacle frame as claimed in claim 3, characterized in that said first and second hinge members are pivotally connected by a pin or screw member extending through aligned holes in said first and second hinge members.

13. A spectacle frame as claimed in claim 4, where said wire material is titanium or a titanium alloy, characterized in that said metallic material is titanium or a titanium alloy of substantially the same composition as said alloy used for said wire material.

14. A spectacle frame as claimed in claim 4, characterized in that said first and second hinge members are pivotally connected by a pin or screw member extending through aligned holes in said first and second hinge members.

15. A spectacle frame as claimed in claim 5, characterized in that said first and second hinge members are pivotally connected by a pin or screw member extending through aligned holes in said first and second hinge members.

16. A hinge assembly for pivotal connection of end pieces of a lens engaging frame member and a temple member of a spectacle frame outside a peripheral edge of a lens engaged by said frame member, said frame and temple members being made of metallic wire material, characterized by comprising first and second hinge members made of substantially the same metallic material as said wire material and each having a bore for accommodation of an end piece (3a to 5a) of said frame member and the end piece of a temple member, respectively, with a firm frictional fit.

17. A hinge assembly as claimed in claims for pivotal connection of substantially parallel end pieces of first and second lens engaging frame members of a spectacle frame with an end piece of a temple member out-side a peripheral edge of a lens having upper and lower peripheral edges engaged by said frame members, characterized in that bore means is provided in said first hinge member for accommodation of both of said substantially parallel end pieces.

18. A hinge assembly as claimed in claim 17, where said wire material is titanium or a titanium alloy, characterized in that said metallic material is titanium or a titanium alloy of substantially the same composition as said alloy used for said wire material.

19. A hinge assembly as claimed in claim 17, if characterized in that said first and second hinge members are pivotally connected by a pin or screw member extending through aligned holes in said first and second hinge members.

20. A hinge assembly as claimed in claim 17, characterized in that said bore means comprises a pair of bores having substantially parallel axes.

21. A hinge assembly as claimed in claim 20, where said wire material is titanium or a titanium alloy, characterized in that said metallic material is titanium or a titanium alloy of substantially the same composition as said alloy used for said wire material.

22. A hinge assembly as claimed in claim 20, characterized in that said first and second hinge members are pivotally connected by a pin or screw member extending through aligned holes in said first and second hinge members.

23. A hinge assembly as claimed in claim 16, characterized in that each of said hinge members is formed as a solid cast member of said metallic material.

24. A hinge assembly as claimed in claim 23, where said wire material is titanium or a titanium alloy, characterized in that said metallic material is titanium or a titanium alloy of substantially the same composition as said alloy used for said wire material.

25. A hinge assembly as claimed in claim 23, if characterized in that said first and second hinge members are pivotally connected by a pin or screw member extending through aligned holes in said first and second hinge members.

26. A hinge assembly as claimed in claim 16, where said wire material is titanium or a titanium alloy, characterized in that said metallic material is titanium or a titanium alloy of substantially the same composition as said alloy used for said wire material.

27. A hinge assembly as claimed in claim 23, characterized in that said first and second hinge members are pivotally connected by a pin or screw member extending through aligned holes in said first and second hinge members.

28. A hinge assembly as claimed in claim 16, characterized in that said first and second hinge members are pivotally connected by a pin or screw member extending through aligned holes in said first and second hinge members.

29. A hinge assembly as claimed in claim 28, characterized in that said aligned holes are formed in bifurcated end part branches of one of said hinge members and an end part of the other hinge member for sandwich arrangement between said bifurcated branches.

30. A hinge assembly as claimed in claim 29, characterized in that a rotational stop for the relative pivotal movement of said hinge members is formed by engagement of an oblique end face of the end part of said other hinge member with an oblique bottom wall of the clearance between said bifurcated end part branches of said one hinge member.

* * * * *